United States Patent Office
3,725,174
Patented Apr. 3, 1973

3,725,174
THERMOPLASTIC POLYMER FILM-POLYHYDRIC
POLYMER FILM LAMINATE
Norman G. Gaylord, New Providence, N.J., assignor to
Champion International Corporation, New York, N.Y.
No Drawing. Continuation-in-part of application Ser. No.
702,204, Feb. 1, 1968, now Patent No. 3,654,939. This
application Jan. 6, 1971, Ser. No. 104,504
Int. Cl. C09j 5/02
U.S. Cl. 156—305                          7 Claims

ABSTRACT OF THE DISCLOSURE

The lamination of at least two layers of normally incompatible polymers is disclosed. One of the polymers is a highly hydrogen bonded polymer, such as cellulose, and the other polymer is a thermoplastic polymer, such as polyethylene. Lamination is accomplished by contacting the opposing surfaces of the layers in the presence of an ethylenically unsaturated carboxylic acid or anhydride, such as maleic anhydride and a free radical initiator. The maleic anhydride thereby reacts with the surfaces and couples the two layers together, forming a bond therebetween.

---

This application is a continuation-in-part of application Ser. No. 702,204, filed Feb. 1, 1968, now U.S. Pat. 3,645,939. This invention relates to a process for coupling a film of thermoplastic polymer to a film of a polyhydric polymer. More particularly, this invention relates to a process for laminating or bonding a film of a thermoplastic polymer to a film of a polyhydric polymer by contacting them in the presence of an ethylenically unsaturated carboxylic acid, substituted carboxylic acid or carboxylic acid anhydride and a free radical precursor or free radical generating agent.

The rapid growth of plastics in areas such as in packaging has markedly affected the traditional use of cellulose in these areas. The use of plastics has not only displaced many paper products but has opened up new areas of use. Because cellulose, and other polyhydride polymers such as starch, are much less expensive than conventional thermoplastic materials and also because they possess certain desirable physical and chemical properties, it would be advantageous to be able to produce films of such materials in conjunction with a film of thermoplastic polymer. However, such films are normally incompatible and are difficult to bond together.

It is an object of this invention to provide means for bonding together or laminating films or layers of two normally incompatible polymers.

It is another object of this invention to couple a layer of a polyolefin, such as polyethylene, with a layer of a cellulosic material, such as cardboard or paper.

These and other objects are attained by the practice of this invention which, briefly, comprises bonding together or laminating at least two layers of normally incompatible polymers, at least one of the layers comprising a highly hydrogen bonded polyhydric polymer and another of the layers comprising a thermoplastic polymer having labile atoms which provide sites for the formation of free radicals. This is accomplished by contacting opposing surface of layers of the normally incompatible polymers in the presence of an ethylenically unsaturated carboxylic acid or substituted carboxylic acid or anhydride under conditions which will generate free radicals on the polymer. The ethylenically unsaturated carboxylic acid is thereby chemically bonded onto the surface of the thermoplastic polymer layer and is reacted with the hydroxyl groups on the surface of the hydroxyl group containing polymer layer by means of esterification and hydrogen bonding. Thus, the ethylenically unsaturated acid acts as a coupling agent between the two layers. The resultant laminate is characterized by improved adhesion.

Highly hydrogen bonded polyhydric polymers include, for example, polysaccharides, such as cellulose, starch, amylose, amylopectin, tapioca, dextrin, etc.; polyvinyl alcohol; and mixture thereof. Cellulose is preferred. When cellulose is used as the polyhydric polymer, the layer may be formed from a pulp by conventional techniques or it may be a film of, for example, acetylated cellulose or regenerated cellulose.

The thermoplastic polymers having labile atoms which provide sites for the formation of free radicals include polymers of olefins (e.g., homopolymers and copolymers of ethylene, propylene, 1-butane, etc.) including copolymers with polar monomers (e.g., ethylene-vinyl acetate copolymers); acrylic resins or elastomers (e.g., homopolymers and copolymers with each other or with other monomers of methyl acrylate, methyl methacrylate, ethyl acrylate, ethyl methacrylate, butyl acrylate, butyl methacrylate, acrylic acid and methacrylic acid); polystyrene; copolymers of styrene and other vinyl monomers such as acrylonitrile; vinyl polymers such as homopolymers and copolymers of vinyl acetate, vinyl chloride alkyl vinyl ether and vinyl butyral; homopolymers and copolymers of dienes such as polybutadiene, polyisoprene, polychloroprene, butadiene-styrene copolymers, isobutylene-isoprene copolymers and other unvulcanized elastomers including natural rubber. Chemical derivatives of such polymers and copolymers of ethylenically unsaturated monomers or dienes (e.g., chlorinated polyethylene, chlorinated polypropylene, chlorinated isoprene copolymers, salts of ethylene-maleic anhydride, ethylene-acrylic acid, ethylene-methacrylic acid, styrene-maleic anhydride, alkyl vinyl ether-maleic anhydride, butadiene-maleic anhydride and isoprene-maleic anhydride copolymers, and completely or partially hydrolyzed ethylenevinyl acetate copolymers may also be used. Polymers of cyclic monomers may also be used (e.g., homopolymers and copolymers of ethylene oxide, propylene oxide, tetrahydrofuran, propiolactone, caprolactone, caprolactam and ethylene imine). Copolymers of carbon monoxide and sulfur dioxide may also be used (e.g., copolymers of carbon monoxide with ethylene and ethylene imine and copolymers of sulfur dioxide with α-olefins, styrene, vinyl chloride and butadiene). Homopolymers and copolymers of carbonyl compounds may also be used (e.g., homopolymers and copolymers of formaldehyde, acetaldehyde, butyraldehyde, chloral, etc.). Condensation polymers may also be used such as polyester and alkyd resins which are obtained by the condensation of a polyhydric alcohol and a polycarboxylic acid. Examples of polycarboxylic acids which may be used to form the polyester resin include phthalic acid, phthalic anhydride, succinic acid, adipic acid, isophthalic acid, terephthalic acid, maleic anhydride, etc. The polyhydric alcohols which may be used in the preparation of the polyester or alkyd resin may include the glycols, such as ethylene glycol, propylene glycol, etc. Polyamide resins may also be used (e.g., polymers obtained by the condensation of a polycarboxylic acid such as adipic acid, terephthalic acid and dimer acid with a polyamine such as ethylene diamine, hexamethylene diamine and diethylene triamine). Polyurethanes may also be used (e.g., polymers obtained by reaction of a diisocyanate such as toluene diisocyanate and 4,4'-diphenylmethane diisocyanate with a polyol such as polyethylene oxide, polypropylene oxide, polytetramethylene glycol, hydroxyl-terminated polyesters, hydroxyl-terminated polyisobutylene and hydroxyl-terminated polybutadiene). Other thermoplastic resins based on bisphenol such as polycarbonates, polysulfones and polysulfonates as well as poly-2,5-dimethylphenylene oxide may also be used. Thermoplastic epoxy resins may be used. Epoxy resins include the condensation products of bisphenol and epichlorohydrin, epoxidized drying oils, the glycidyl ethers of glycerol, epoxylated novolac resins, etc. The thermoplastic resin may be a resin which is capable of being thermoset or cured but which is contacted with the hydroxyl group containing material at temperatures and conditions which will not thermoset or cure the resin. Such resins include silicone resins and elastomers and thermosetting acrylic resins. The labile atom on the polymer may be, for instance, a hydrogen atom or a halogen atom.

The preferred thermoplastic polymer layers are films of polyolefins, including homopolymers and copolymers of olefins such as ethylene, propylene, 1-butene, etc. The preferably contain from 2 to 20 carbon atoms. The preferred polyolefins are low or high density polyethylene and polypropylene. Oxidized polyolefins may also be used. A filler, such as clay, may be incorporated into the polyolefin film.

The ethylenically unsaturated carboxylic acid or anhydride coupling agent used in the practice of this invention is preferably dicarboxylic such as maleic acid, maleic anhydride, fumaric acid, citraconic acid, or itaconic acid. Maleic anhydride is the preferred coupling agent. Monocarboxylic acids, such as acrylic acid and methacrylic acid, may also be used.

The means for generating free radicals on the thermoplastic polymer is preferably accomplished by using a free radical catalyst such as a peroxide (e.g., dicumyl peroxide, methylethylketone peroxide, benzoyl peroxide, di-t-butyl peroxide, and 2,5-dimethyl-2,5-di(t-butyl peroxy)hexane). A more detailed compilation of free radical initiators which may be used is set forth at pages II–3 to II–51 of "Polymer Handbook," Interscience Publishers (1966), the disclosure of which is incorporated herein by reference. Free radicals may also be formed on the thermoplastic polymer by other means such as by thermal fission or radiation or exposure to oxygen or ozone.

In preparing the compositions of this invention, it is preferred to use from about 0.1 to 20% by weight of the ethylenically unsaturated carboxylic acid or anhydride coupling agent, based on the combined weights of the films.

The films or layers of the normally incompatible polymers may be laminated together by exposing a surface of one layer to maleic anhydride vapor, which sublimes and condenses thereon, and spraying a solution of free radical initiator on a surface of the other layer. The treated surfaces are then pressed together. Alternatively, the surfaces of one sheet may be treated with the carboxylic acid or anhydride and a solution of the free radical initiator and the treated surface contacted with the surface of the other layer. The sheets should be pressed together at a sufficiently high temperature to decompose the free radical initiator and induce the coupling reaction. The carboxylic acid or anhydride thus simultaneously or consecutively adducts or reacts with the thermoplastic polymer and esterifies and forms hydrogen bonds with the layer containing hydroxyl groups. Thus, the carboxylic acid links the films together. When one of the films used is polyethylene and the other film is cellulosic and maleic anhydride is used as the coupling agent, the polyethylene and cellulosic films are linked together by means of the maleic anhydride forming a block copolymer containing a succinic half acid ester bridge between the cellulose and the polyethylene films.

The peroxide and maleic anhydride may also be sprayed or otherwise applied to a continuous web or board a cellulose web. The treated board may then be passed under a stream of molten polyethylene at a temperature adequate to decompose the peroxide which then generates free radicals on the polyethylene.

The laminated products of this invention may be used to form products such as bottles, thus permitting the use of cellulose in areas where plastics now predominate. They may also be used in other containers such as boxes.

The following examples illustrate the lamination of sheets of polyethylene between milk carton boards:

EXAMPLES 1–4

In these examples, milk carton stock boards are dried in an oven at 100° C. to constant weight. The boards and/or polyethylene sheets are then treated as indicated in Table I wherein "MA" indicates treatment with maleic anhydride, "Peroxide" indicates treatment with t-butyl peroxypivalate, and "MA-Peroxide" indicates preliminary treatment with maleic anhydride and subsequent treatment with t-butyl peroxypivalate. When the board is treated with maleic anhydride, one surface is exposed to the vapor by placing the board over a tray in which 5 g. of maleic anhydride is evaporated at 100° C. The board is covered by a glass plate. The exposure time varies from 2 to 10 minutes. When the polyethylene sheet is treated with maleic anhydride, the sheet is suspended in a flask filled with maleic anhydride vapor at 100° C. for 3 to 4 minutes. The weight increase of the board or polyethylene sheet is measured as maleic anhydride take-up. Peroxide catalyst in the form of a 7.5% solution of t-butyl peroxypivalate in hexane is sprayed on the polyethylene film or the board.

After treatment, two strips of board, 2 in. wide, are sandwiched with a polyethylene sheet in between. Since the paper is treated on one side only, the treated side is placed in contact with the polyethylene. The laminate is then pressed in a hydraulic press at 130° C. at about 550 p.s.i. for 5 minutes.

The bondinng or adhesion is tested by trying to delaminate the sandwich. If this can be done only by tearing the paper apart, the bonding is considered as "good." If the paper layers can be separated without too much damage to the paper surface, the bonding is considered as "poor."

For purposes of comparison, laminates are also prepared from board and polyethylene sheets wherein neither have been treated with maleic anhydride or peroxide (Control A), wherein the board is treated with maleic anhydride but no peroxide is used on the board or polyethylene sheet (Control B), and wherein the polyethylene sheets are treated with peroxide but no maleic anhydride is used (Control C).

The results shown in Table I demonstrate that improved adhesion is obtained when both maleic anhydride and peroxide are used, regardless of the surface to which they are applied.

TABLE I

| | Treatment | | Maleic anhydride takeup, mg./in.² | Bonding |
|---|---|---|---|---|
| | Board | Polyethylene | | |
| Control: | | | | |
| A | None | None | | Poor. |
| B | MA | do | 0.18 | Do. |
| C | None | Peroxide | | Do. |
| Example: | | | | |
| 1 | MA-peroxide | None | 12.5 | Good. |
| 2 | MA | Peroxide | 14.1 | Do. |
| 3 | MA | do | 4.28 | Do. |
| 4 | None | MA-peroxide | 0.29 | Do. |

Other laminates may be prepared employing the procedures set forth in the preceding examples and in the more general description of this invention set forth hereinabove.

I claim:

1. A process for bonding together at least two layers of normally incompatible polymers, at least one of said layers comprising a highly hydrogen bonded polyhydric polymer and at least one other of said layers comprising a thermoplastic polymer having labile atoms which provide sites for the formation of free radicals, which comprises placing an ethylenically unsaturated carboxylic acid or anhydride and a free radical catalyst between opposing surfaces of said layers and pressing said opposing layers together at a temperature sufficient to decompose the free radical catalyst, whereby said ethylenically unsaturated carboxylic acid or anhydride reacts with said surfaces and couples and said layers.

2. A process as defined in claim 1 wherein said ethylenically unsaturated acid or anhydride is maleic anhydride.

3. A process as defined in claim 2 wherein said highly hydrogen bonded polyhydric polymer is a member selected from the group consisting of polysaccharides, polyvinyl alcohol and mixtures thereof.

4. A process as defined in claim 3 wherein said thermoplastic polymer is a polyolefin.

5. A process as defined in claim 4 wherein said polyhydric polymer is cellulose.

6. A process as defined in claim 5 wherein a continuous web of cellulose is passed under a spray of a free radical initiator and maleic anhydride and the treated web is passed under a stream of molten polyethylene.

7. A process for laminating a layer of polyethylene to a layer of cellulosic material which comprises placing maleic anhydride and a free radical initiator between opposing surfaces of said layers, and pressing said opposing layers together at a temperature sufficient to decompose said free radical initiator, whereby said maleic anhydride reacts with said surfaces and couples said layers.

References Cited

UNITED STATES PATENTS

| | | | |
|---|---|---|---|
| 3,108,902 | 10/1963 | Galli et al. | 161—188 |
| 3,239,478 | 3/1966 | Harlan, Jr. | 161—247 |

WILLIAM J. VAN BALEN, Primary Examiner

U.S. Cl. X.R.

156—308; 161—250, 251, 252